Patented Jan. 15, 1924.

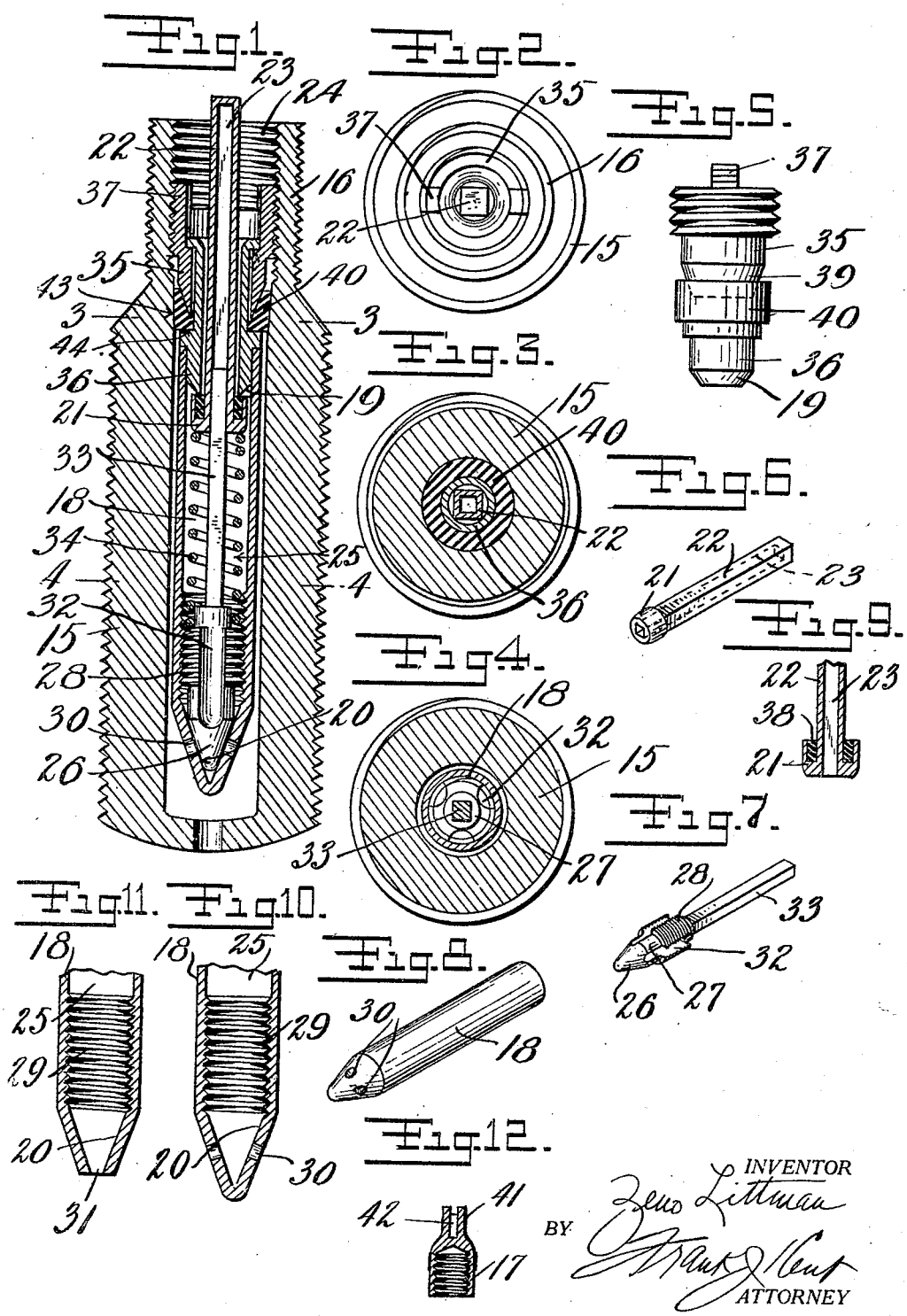
Jan. 15, 1924.  Z. LITTMAN  1,481,018
PNEUMATIC TIRE VALVE
Filed Jan. 10, 1923

1,481,018

UNITED STATES PATENT OFFICE.

ZENO LITTMAN, OF NEW YORK, N. Y.

PNEUMATIC-TIRE VALVE.

Application filed January 10, 1923. Serial No. 611,715.

*To all whom it may concern:*

Be it known that I, ZENO LITTMAN, a citizen of the United States, residing at New York, in the county of New York and State of New York, have invented certain new and useful Improvements in Pneumatic-Tire Valves, of which the following is a specification.

This invention relates to inflation valves such as are used in connection with pneumatic tires for vehicles.

In United States Patent No. 1,397,737 granted to me on November 22, 1921, I have described and claimed an improved tire valve of a type providing a double seal by the use of two valve members cooperating with corresponding valve seats formed at opposite ends of a valve chamber. Provision was made for the manipulation and adjustment of the two valves while in place in the chamber and the entire structure was housed in a tubular casing formed to be mounted as an extension of a standard type of valve shell or casing carried by the tire and from the interior of which the regular valve equipment was removed.

In the present invention the advantageous features of the double seal are again employed with the additional material advantage that the structure has been further simplified and reduced in compass to a point permitting of the mounting of the new double valve structure within the well-known standard valve casing referred to and in place of the standard and less desirable single-valve equipment ordinarily employed. The substitution of the improved double seal structure for the regular valve equipment is accomplished without making any change in the standard valve casing with which vehicle tires are regularly equipped, nor does the new and improved structure alter the external appearance of the standard valve shell or casing in any way when in operative position therein.

In this invention a valve chamber, provided at its outer and inner ends with valve seats with which valve members cooperate to form a double seal, is again employed. The outer valve is capable of being moved directly from its seat by the inward movement of a valve stem extending outwardly to an accessible position adjacent the outer end of the main valve casing, a spring preferably being mounted within the chamber and between the valves to normally hold the outer valve against its seat. The inner valve has a screw threaded relation to the inner end of the valve chamber and is provided with a stem extending into a slideway in the outer valve and stem and in which the inner valve stem has longitudinal but non-rotative relative movement.

By this construction it will be seen that the outer valve can be manipulated by the reciprocation of the outer valve stem, and that the inner valve can be brought into or out of engagement with its seat by rotation of the accessible outer valve stem. The relatively simple and compact structure described not only facilitates the manipulation of the inner sealing valve, but the structure particularly lends itself to being housed in a special casing that provides a unitary and compact device capable of being mounted within a standard valve casing as has already been referred to.

Other features of the invention will be hereinafter referred to.

In the drawings in which a preferred embodiment of the invention has been selected for illustration, Figure 1 is a view in vertical section of a tire inflation valve structure embodying the invention.

Figure 2 is a plan view on an enlarged scale of the device shown in Figure 1.

Figure 3 is a view in cross-section taken on the line 3—3 of Figure 1.

Figure 4 is a view similar to Figure 3 taken on the line 4—4 of Figure 1.

Figure 5 is a view in side elevation and greatly enlarged of a fitting used to provide an air tight connection between the device and a standard valve casing.

Figure 6 is an isometric view of an outer valve and stem forming part of the device.

Figure 7 is a view similar to Figure 6 of an inner valve and stem forming part of the construction.

Figure 8 is a view similar to Figure 6 showing a housing member for the structural parts of the device.

Figure 9 is a view in vertical section of the inner valve shown in Figure 6.

Figure 10 is a view similar to Figure 9 of the inner end of the housing shown in Figure 8.

Figure 11 is a view similar to Figure 10 of a modified form of housing.

Figure 12 is a view of a valve cap used in connection with the improved valve construction.

Referring to the drawings for a more detailed description of the invention, at 15 is shown a standard and well-known tire valve casing or shell of the Schrader type and which is provided at its outer end with a reduced portion 16 threaded on its outer surface to receive a cap 17, shown in Figure 12, and having its interior surface threaded to receive the valve structure.

Instead of the ordinary single-valve construction which is not wholly impervious to leakage of air therethrough, I provide a valve structure having a double seal and including an elongated valve chamber member 18 having a valve seat 19 at its upper end approximating the construction of the single-valve structure heretofore known and a supplementary valve seat 20 at its lower end.

A valve 21 is provided with a stem 22 extending outwardly to a position accessible to the open end 24 of the casing 15 and cooperates with the upper or outer valve seat 19 to control the passage of air into or out of the valve chamber 25. The valve stem 22 differs from valve stems used in a similar situation in foregoing structures in being provided with an axially extending slideway 23 having a square or other non-circular cross-section and closed at its upper or outer end.

Cooperating with the conical valve seat 20 in the lower or inner end of the valve chamber 25 is a correspondingly shaped valve member 26 having its body portion 27 provided with a screw thread 28 for engagement with a screw thread 29 formed on the inner surface of the member 18 near its lower end. The conical end portion of the member 18 is provided with ports 30 as in Figure 10 or 31 in Figure 11 to permit the flow of air therethrough when the valve 26 is withdrawn from engagement with seat 20, and passages 32 formed in the valve body 27 and the threaded portion 28 establish communication between the ports 30 and 31 and the valve chamber 25.

The valve body 27 is provided with an outwardly extending stem 33 having a formation in cross-section such as will permit the stem 33 to slide longitudinally in the axially extending slideway 23 in the outer valve stem 22 but will prevent relative rotation of the two valve stems. In the normal position of the parts shown in Figure 1 the upper end of the inner valve stem 33 extends into and constantly engages the slideway 23 in the outer valve stem 22. A spring 34 encloses the lower valve stem 33 within the valve chamber and serves to normally and resiliently hold the valve 21 pressed into engagement with the outer valve seat 19 to bring a body of rubber 38 or like material into sealing contact therewith.

With this construction it will be seen that pressure against the outer end of the valve stem 22 will unseal the upper valve 21, while rotation of the valve stem 22 will produce corresponding rotation of the inner valve stem 33 and threaded portion 28 to move the valve 26 into or out of engagement with its seat 20. Thus by withdrawing the valve 26 from its seat the tire can be inflated through the yielding upper valve 21 following which the valve 26 can be rotated into leakproof metal-to-metal engagement with its seat to provide an extremely effective seal.

The valve chamber member 18 carries in sealed relation thereto at its upper end a tubular member 36 whose lower extremity is the valve seat 19. The member 36 which has a swiveled connection with a sleeve 35 threaded on its outer surface for engagement with the inner threaded surface of the reduced portion 16 of the valve casing 15. The sleeve 36 is provided with a downwardly converging portion 39 which serves as a wedge to force a band of rubber 40 or like material into effective sealing engagement with the inner surface of the shell 15 at a tapered section 43 thereof and with a shoulder 44 on the member 36 when the sleeve is rotated into position by means of the upstanding lugs 37.

In order to manipulate the sleeve 35 as well as to rotate the valve stem 22, the cap 17 is provided with a transversely slotted extension 41 for engagement with the lugs 37, as well as with an opening 42 square in cross-section for engagement with the stem 22 for rotating the same.

What I claim is:—

1. In a valve structure, a valve chamber adapted to be mounted in a tire valve shell, two valves and valve seats in said chamber, and means for manipulating either valve from the open end of the shell.

2. In a valve structure, a tubular valve chamber adapted to be substituted for the valve construction in a standard tire valve shell, a valve seat at each end of the chamber, a valve for each seat, and common operating means for the valves accessible at the open end of the shell.

3. In a valve structure, a tubular valve chamber adapted to be mounted in a standard tire valve shell, a valve seat at each end of the chamber, a valve for each seat, the outer valve having a stem extending to a point accessible to the open end of the shell, and a connection between the inner valve and said outer valve stem whereby either valve can be manipulated by means of the outer valve stem.

4. In a valve structure, a tubular valve chamber adapted to be mounted in a tire valve shell, a valve seat at each end of the chamber, a valve for each seat, the outer valve opening inwardly and having a stem extending to a point accessible to the open end of the shell, said inner valve opening outwardly, means for holding said inner valve in open or closed position, and a connection between said inner valve and said outer valve stem for opening or closing said inner valve.

5. In a valve structure, a tubular valve chamber adapted to be mounted in a tire valve shell, a valve seat at each end of the chamber, a valve for each seat, said outer valve opening inwardly and having spring means for normally holding it in closed condition, said inner valve opening outwardly and having means for positively holding it in open or closed condition, and manually operable means for manipulating said inner valve.

6. In a valve structure, a tubular valve chamber adapted to be mounted in a tire valve shell, a valve seat at each end of the chamber, a valve for each seat, said outer valve opening inwardly and having spring means for normally holding it in closed condition, a stem for said outer valve projecting to a point adjacent the open end of the shell, said inner valve having a screw threaded connection with the inner wall of the chamber, and a connection between the inner valve and the outer valve stem whereby the outer valve stem can be rotated to manipulate the inner valve.

7. In a valve structure, a tubular valve chamber adapted to be mounted in a standard tire valve shell, a valve seat at each end of the chamber, a valve for each seat, the outer valve opening inwardly and having a stem extending outwardly to a point adjacent the open end of the shell, said valve and stem being provided with an axially disposed opening, said inner valve having a screw-threaded connection with the inner wall of the chamber, said inner valve having a stem extending into the opening in the outer valve and stem, said valve stems being longitudinally slidable but non-rotatable with relation to each other whereby the outer valve stem can be moved longitudinally to manipulate the outer valve and rotated to manipulate the inner valve.

8. In a valve structure, a tubular valve chamber adapted to be mounted in a standard tire valve shell, a valve seat at each end of the chamber, a valve for each seat, the outer valve opening inwardly and having a stem extending outwardly to a point adjacent the open end of the shell, said valve being provided with a rubber contact surface, a spring in the chamber bearing against the outer valve to normally hold it in closed condition, said outer valve and stem being provided with an axially disposed non-circular opening, said inner valve having a screw-threaded connection with the inner wall of the chamber and said inner valve and seat having a conical formation for metal-to-metal contact, said inner valve having a stem extending into the opening in the outer valve and stem, said valve stems being longitudinally slidable with relation to each other whereby the outer valve stem can be moved longitudinally to unseat the outer valve or rotated to manipulate the inner valve.

9. In a valve structure, a tubular valve chamber, a valve seat at each end of the chamber, a valve for each seat, means for manipulating the valves from one end of the chamber, and a screw-threaded connection between the valve chamber and the inner surface of a standard valve shell including a sleeve of cushioning material and a cone-shaped member arranged to be forced beneath said sleeve to force the same into sealing engagement with the inner surface of the valve shell.

In testimony whereof I affix my signature.

ZENO LITTMAN.